United States Patent [19]

Rhoads

[11] Patent Number: 5,474,390
[45] Date of Patent: Dec. 12, 1995

[54] THRUST BEARING ASSEMBLY

[75] Inventor: Thomas G. Rhoads, Thomaston, Conn.

[73] Assignee: The Torrington Company, Torrington, Conn.

[21] Appl. No.: 430,700

[22] Filed: Apr. 28, 1995

Related U.S. Application Data

[63] Continuation-in-part of Ser. No. 221,119, Mar. 31, 1994.

[51] Int. Cl.[6] ................................................. F16C 33/46
[52] U.S. Cl. ................................ 384/623; 384/618
[58] Field of Search ................................ 384/126, 127, 384/452, 604, 608, 618–623

[56] References Cited

U.S. PATENT DOCUMENTS

| 799,765 | 9/1905 | Tweeden . | |
|---|---|---|---|
| 1,169,880 | 2/1916 | Sörensen . | |
| 1,426,038 | 8/1922 | Burkholder . | |
| 1,622,065 | 3/1927 | Symanzik . | |
| 2,055,524 | 9/1936 | Ellis | 384/621 |
| 3,328,098 | 6/1967 | Budzich | 384/608 |
| 4,413,866 | 11/1983 | Geisey . | |
| 5,205,657 | 4/1993 | Feld | 384/618 X |

FOREIGN PATENT DOCUMENTS

| 3905986 | 7/1990 | Germany | 384/452 |
|---|---|---|---|
| 272529 | 10/1993 | Japan | 384/623 |

*Primary Examiner*—Thomas R. Hannon
*Attorney, Agent, or Firm*—John C. Bigler

[57] ABSTRACT

A thrust washer has a radially directed annular portion providing a first raceway and an axially directed annular flange. A subassembly comprising a plurality of rollers, in rolling contact with the raceway, retained axially and radially in a roller cage, has a pilot surface facing the axially directed annular flange. A bushing or rolling element between the pilot surface and the axially directed annular flange reduces friction between the pilot surface and the flange while maintaining concentricity of the subassembly relative to the thrust washer.

9 Claims, 1 Drawing Sheet

THRUST BEARING ASSEMBLY

This application is a continuation-in-part of application Ser. No. 08/221,119, filed Mar. 31, 1994.

BACKGROUND OF THE INVENTION

This invention relates generally to thrust bearings and, more particularly, to a thrust bearing assembly having a thrust washer and caged rollers for receiving an axial load between relatively rotatable members.

One common type of thrust bearing assembly comprises a cage and roller subassembly positioned between thrust washers and piloted on flanges of the thrust washers. The relative rotation between the thrust washers and the cage and roller subassembly produces heat, wear and drag associated with friction within the thrust washer assembly. The heat, wear and drag are amplified by increasing rotational speed, out-of-square geometry of adjacent members backing up the thrust bearing assembly, and eccentricity of the elements of the thrust bearing assembly, as well as other factors.

The foregoing illustrates limitations known to exist in present thrust bearing assemblies. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a thrust bearing assembly comprising a thrust washer having a radially directed annular portion providing a raceway and an axially directed annular flange. A subassembly comprising a plurality of rollers, in rolling contact with the raceway, and a roller cage retaining the rollers axially and radially, has a pilot surface facing the axially directed annular flange. Friction reducing means between the pilot surface and the axially directed annular flange reduces friction between the pilot surface and the flange while maintaining concentricity of the subassembly relative to the thrust washer.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
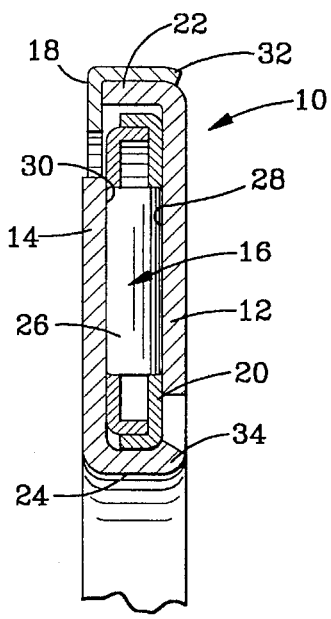
FIG. 1 is a cross-sectional view illustrating a prior art thrust bearing assembly.

Referring now to the drawings, FIG. 1 illustrates prior art thrust bearing assembly 10 comprising first thrust washer 12, second thrust washer 14, roller and roller cage subassembly 16, and outer cup 18.

Roller cage 20 of subassembly 16 is piloted on axially directed annular first flange 22, integrally formed with first thrust washer 12, and/or on axially directed annular second flange 24, integrally formed with second thrust washer 14. Rollers 26 of subassembly 16 roll on first raceway 28 and second raceway 30 of radially directed portions of first and second thrust washers 12 and 14, respectively. Thrust bearing assembly 10 is held together by lip 32 of outer cup 18 and lip 34 on second flange 14, which wrap around first thrust washer 12 and roller cage 20, respectively.

Figure 2:
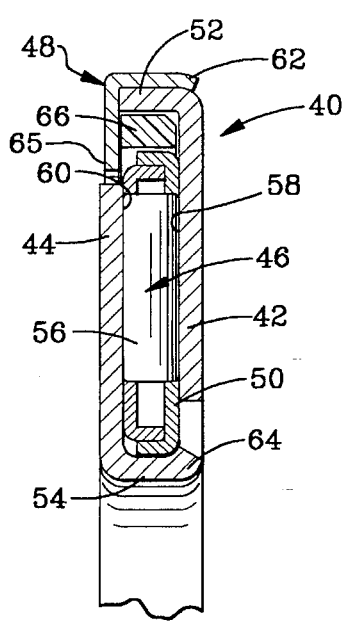
FIG. 2 is a cross-sectional view illustrating a first embodiment of the thrust bearing assembly of the present invention.

Thrust bearing assembly 40 of FIG. 2 illustrates an embodiment of the present invention comprising first thrust washer 42, second thrust washer 44, roller and roller cage subassembly 46, and outer cup 48.

Roller cage 50 of subassembly 46 is radially spaced from axially directed annular first flange 52, integrally formed with first thrust washer 42, and is adjacent to axially directed annular second flange 54, integrally formed with second thrust washer 44. Rollers 56 of subassembly 46 roll on first raceway 58 and second raceway 60 of radially directed portions of first and second thrust washers 42 and 44, respectively. Thrust bearing assembly 40 may be held together by various means, such as, for example, lip 62 of outer cup 48 and lip 64 on second flange 54 which wrap around first thrust washer 42 and roller cage 50, respectively, and flange 65 of outer cup 48 which also wraps around roller cage 50. Lips 62 and 64 may be formed by spinning, dimpling, staking or other means.

The radial space between roller cage 50 and first flange 52 is sufficient to contain a friction reducing element, such as first bushing 66, for example, for improved piloting of subassembly 46. First bushing 66 may be molded of a suitable polymer, such as, for example, polyetheretherketone or VESPEL (available from DuPont, Wilmington, Del.), or may be machined or otherwise formed of bronze or other material providing low friction and low wear for sliding contact with adjacent elements of the bearing assembly, such as, for example, first thrust washer 42, roller cage 50 and outer cup 48. If desired, additional piloting of roller cage 50 may be provided by sliding engagement with second flange 54.

Figure 3:
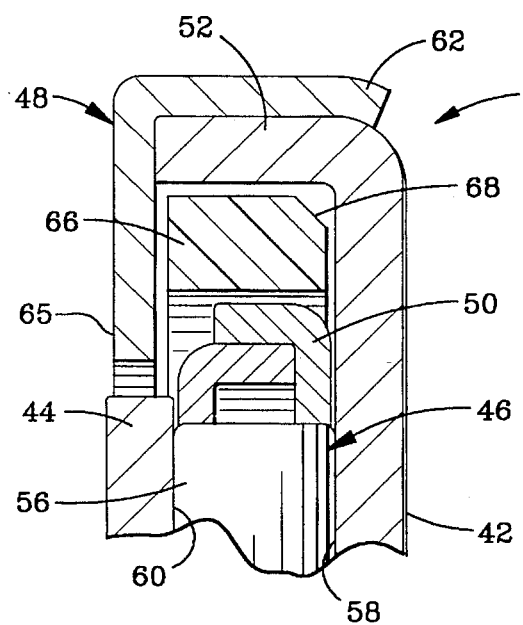
FIG. 3 is an enlarged cross-sectional view of a portion of the thrust bearing assembly of FIG. 2.

As best shown in FIG. 3, first bushing 66 may have beveled surface 68 or may be otherwise configured to provide clearance for an internal radius connecting the radially directed portion of first thrust washer 42 (including first raceway 58) with the axially directed portion forming first flange 52. The radial thickness and the axial length of first bushing 66 depend on the size, speed of rotation and load of thrust bearing assembly 40. For a typical configuration with a 2-inch outside diameter, for example, the radial thickness and axial length may be, 0.030 and 0.250 inches, respectively.

Figure 4:
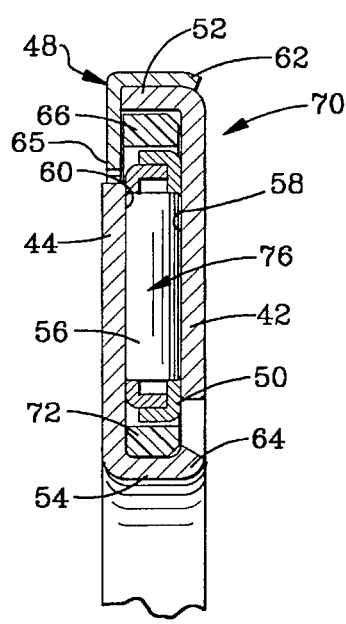
FIG. 4 is a cross-sectional view illustrating a second embodiment of the thrust bearing assembly of the present invention.

Thrust bearing assembly 70 of FIG. 4 illustrates a second embodiment of the present invention similar to thrust bearing assembly 40. In addition to first bushing 66, thrust bearing assembly 70 includes a second friction reducing element, such as second bushing 72, for example, between second flange 54 and roller cage 74, to further improve piloting of roller cage 74. Compared to subassembly 46 of FIG. 2, subassembly 76 of FIG. 4 provides increased radial clearance between roller cage 74 and second flange 54 for location of second bushing 72.

In addition to the configurations of FIGS. 2 and 4, the present invention may employ a single friction reducing element for piloting a roller and roller cage subassembly at its inside diameter. In that configuration, second bushing 72, for example, would be used without first bushing 66. The roller cage for that configuration would have a modified form to position the rollers on the desired raceway surfaces and to provide a desired radial spacing at its outside diameter to facilitate additional piloting or other requirements.

Figure 5:
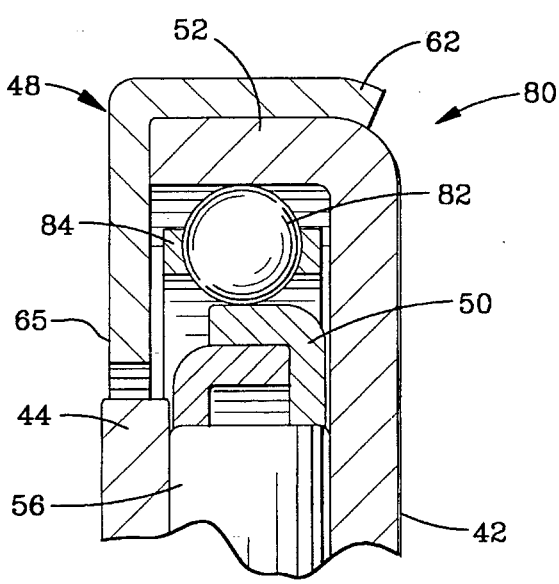
FIG. 5 is a cross-sectional view illustrating a third embodiment of the thrust bearing assembly of the present invention.

FIG. 5 illustrates a third embodiment of the present invention similar to that of FIGS. 2 and 4 but incorporating a different type of friction reducing element. In place of first bushing 66, thrust bearing assembly 80 includes a plurality of rolling elements such as, for example, needle rollers or balls 82, within retainer or cage 84, to reduce friction during piloting of roller cage 50. Balls 82 provide rolling contact with first thrust washer 42 and roller cage 50, further reducing friction. A rolling element friction reducing means may also be employed in place of second bushing 72.

The present invention is applicable to a wide range of thrust bearing configurations with various types of roller cages. The bushing or other friction reducing element may be positioned between the roller cage and piloting flange of any thrust washer to effect the present invention. The piloting flange may be a separate annular axially directed surface rigidly attached to the thrust washer or may be integrally formed with the thrust washer by bending, crimping, machining or other means.

From the above description, it will be apparent that the present invention provides improved piloting of a roller and roller cage subassembly in many forms of thrust bearing assemblies. Heat, wear and drag resulting from friction between elements of the thrust bearing assembly are substantially reduced. In addition, the present invention may permit higher rotational speed of the thrust bearing assembly and increased out-of-square geometry of backup members or eccentricity of the elements of the thrust bearing assembly.

Having described the invention, what is claimed is:

1. A thrust bearing assembly comprising:
   a first thrust washer having a first radially directed annular portion providing a first raceway and an axially directed annular first flange;
   a subassembly comprising a plurality of rollers, in rolling contact with the first raceway, and a roller cage retaining the rollers axially and radially, the subassembly having a pilot surface facing the first flange; and
   a first annular bushing, having a clearance fit between the pilot surface of the subassembly and the first flange, for reducing friction between the pilot surface and the first flange while maintaining concentricity of the subassembly relative to the first thrust washer.

2. The thrust bearing assembly according to claim 1, wherein the annular bushing is made of a polymer.

3. The thrust bearing assembly according to claim 1, further comprising a second thrust washer with a second radially directed annular portion providing a second raceway opposite the first raceway, the rollers being in rolling contact with the second raceway.

4. The thrust bearing assembly according to claim 3, further comprising connecting means for retaining the first thrust washer with respect to the second thrust washer together such that the subassembly and the first friction reducing means are held with the first thrust washer and the second thrust washer as an assembly.

5. The thrust bearing assembly according to claim 3, wherein the second thrust washer includes an axially directed annular second flange opposite the first flange, the subassembly being located between the first flange and the second flange.

6. The thrust bearing assembly according to claim 5, further comprising a second annular bushing between the subassembly and the second flange for reducing friction between the subassembly and the second flange while maintaining concentricity of the subassembly relative to the second thrust washer.

7. The thrust bearing assembly according to claim 6, wherein the second annular bushing is made of a polymer.

8. The thrust bearing assembly according to claim 5, further comprising a plurality of rolling elements between the subassembly and the second flange for reducing friction between the subassembly and the second flange while maintaining concentricity of the subassembly relative to the second thrust washer.

9. A thrust bearing assembly comprising:
   a first thrust washer having a first radially directed annular portion providing a first raceway and an axially directed annular first flange;
   a subassembly comprising a plurality of rollers, in rolling contact with the first raceway, and a roller cage retaining the rollers axially and radially, the subassembly having a pilot surface facing the first flange;
   a plurality of rolling elements between the pilot surface of the subassembly and the first flange for reducing friction between the pilot surface and the first flange while maintaining concentricity of the subassembly relative to the first thrust washer; and
   an outer cup fixed over the first thrust flange and engageable with the roller cage such that the roller cage is retained between the first thrust flange and the outer cup.

* * * * *